(12) United States Patent
Smart et al.

(10) Patent No.: US 8,204,724 B2
(45) Date of Patent: Jun. 19, 2012

(54) PREDICTING BEHAVIOR OF A TOOL USING A MODEL OF A RHEOLOGICAL CHARACTERISTIC OF A FLUID

(75) Inventors: Moises Enrique Smart, Houston, TX (US); Carlos Abad, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 714 days.

(21) Appl. No.: 11/859,049

(22) Filed: Sep. 21, 2007

(65) Prior Publication Data

US 2009/0083017 A1  Mar. 26, 2009

(51) Int. Cl.
  *G06G 7/50* (2006.01)
  *G06G 7/48* (2006.01)
(52) U.S. Cl. ............................................. 703/9; 703/10
(58) Field of Classification Search .................. 703/9, 10
  See application file for complete search history.

(56) References Cited

U.S. PATENT DOCUMENTS

| | | | |
|---|---|---|---|
| 5,887,654 A | 3/1999 | Edwards et al. | |
| 5,890,539 A | 4/1999 | Huber et al. | |
| 6,182,750 B1 | 2/2001 | Edwards et al. | |
| 6,213,203 B1 | 4/2001 | Edwards et al. | |
| 6,354,374 B1 | 3/2002 | Edwards et al. | |
| 6,837,310 B2 | 1/2005 | Martin | |
| 7,024,342 B1 * | 4/2006 | Waite et al. | 703/6 |
| 7,084,095 B2 | 8/2006 | Lee et al. | |
| 7,182,139 B2 | 2/2007 | Rayssiguier et al. | |
| 7,516,793 B2 * | 4/2009 | Dykstra | 166/308.1 |

OTHER PUBLICATIONS

Dindar, High-pressure viscosity and density of polymer solutions at the critical polymer concentration in near-critical and supercritical fluids, 2001, Virginia Polytechnic Institute and State University.*
Quinones-Cisneros et al., Viscosity Modeling and Prediction of Reservoir Fluids: From Natural Gas to Heavy Oils, International Journal of Thermophysics, vol. 25, No. 5, Sep. 2004, pp. 1353-1366.*
Vlachopoulos et al., The Role of Rheology in Polymer Extrusion, 2003.*
Tuan et al., Measurement and Modeling of Viscosity of Supercritical Carbon Dioxide/Biomaterial(s) Mixtures, Ind. Eng. Chem. Res. 1999, 38, 2129-2136.*

* cited by examiner

*Primary Examiner* — Dwin M Craig
*Assistant Examiner* — Aniss Chad
(74) *Attorney, Agent, or Firm* — Chadwick A. Sullivan; Rodney Warfford

(57) ABSTRACT

A model of at least one rheological characteristic of a fluid is provided. According to the model, a behavior of the tool that includes an actuator that uses the fluid is predicted. The behavior of the tool is predicted for at least one expected condition in a well.

16 Claims, 4 Drawing Sheets

PREDICTING BEHAVIOR OF A TOOL USING A MODEL OF A RHEOLOGICAL CHARACTERISTIC OF A FLUID

TECHNICAL FIELD

The invention relates generally to predicting behavior of a downhole tool for an expected condition in a well according to a model of at least one rheological characteristic of a fluid used in an actuating mechanism of the downhole tool.

BACKGROUND

Various operations can be performed in well, including firing perforating guns, setting packers, and/or actuating other types of downhole tools. A common technique of actuating a downhole tool is by using a hydraulic actuator that employs a delayed trigger mechanism. The delayed trigger mechanism typically includes an orifice through which hydraulic fluid is metered at a relatively slow rate from a high pressure chamber that contains the hydraulic fluid to a low pressure chamber (e.g., air chamber).

The rate at which the hydraulic fluid flows through the orifice provides the delay to allow for delayed triggering when actuating the tool. An issue associated with using such a hydraulic actuator is that a rheological characteristic of the hydraulic fluid may be unstable at different temperatures and pressures, especially elevated temperatures and pressures that are present in a well. This may result in unpredictable delays provided by the delayed trigger mechanism of the hydraulic actuator. As a result, a tool may not exhibit a desired performance due to the instability of the rheological characteristics of a hydraulic fluid.

SUMMARY

In general, according to an embodiment, a method provides a model of at least one rheological characteristic of a fluid, and predicting, according to the model, a behavior of a tool that includes an actuator that uses the fluid for at least one expected condition in a well.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

As used here, the terms "above" and "below"; "up" and "down"; "upper" and "lower"; "upwardly" and "downwardly"; and other like terms indicating relative positions above or below a given point or element are used in this description to more clearly describe some embodiments of the invention. However, when applied to equipment and methods for use in wells that are deviated or horizontal, such terms may refer to a left to right, right to left, or diagonal relationship as appropriate.

Figure 1:
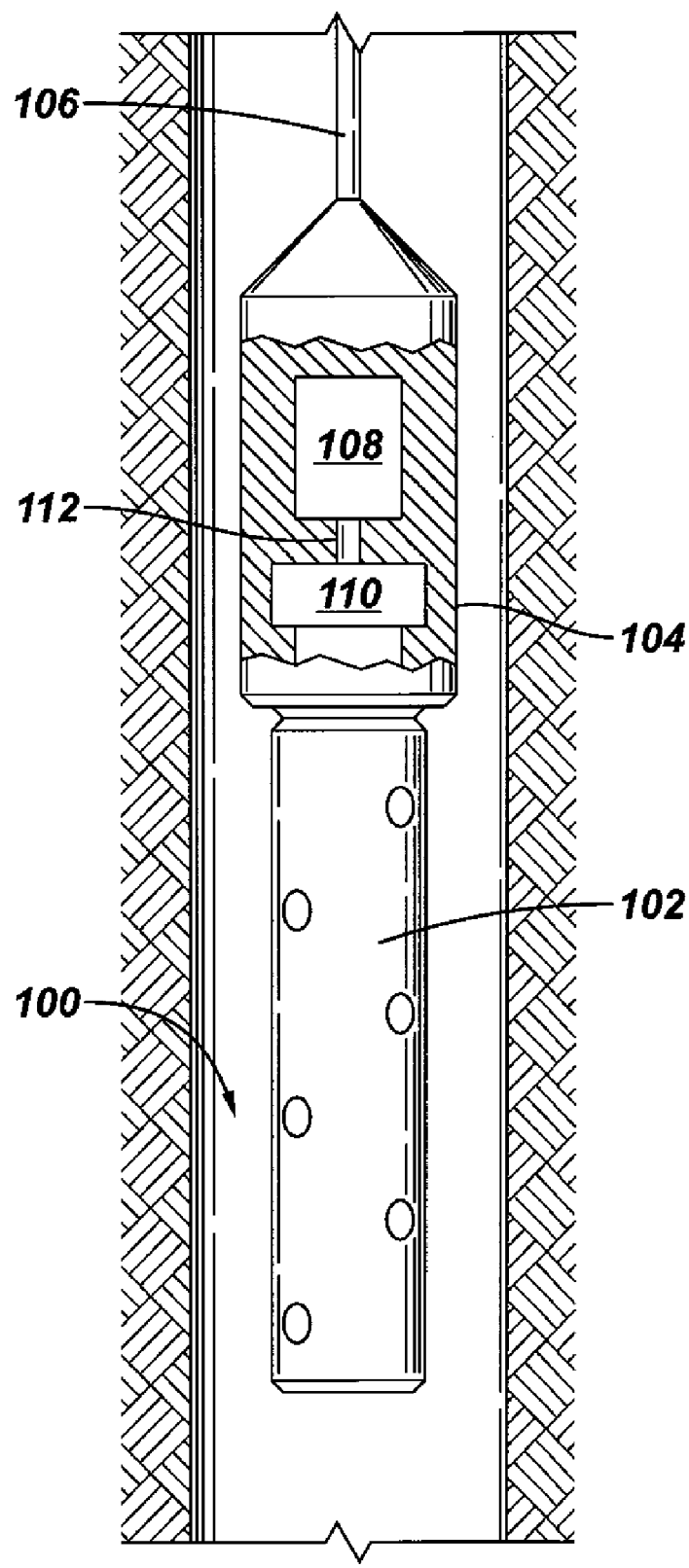
FIG. 1 illustrates an example downhole tool that can be deployed in a well, where an actuator of the downhole tool contains a hydraulic fluid selected according to an embodiment.

FIG. 1 provides a schematic illustration of an example toolstring that can be deployed into a well 100. The toolstring includes a downhole tool 102 (e.g., perforating gun) that is attached to an actuator 104 (e.g., firing head). In other examples, the downhole tool 102 can be a packer that can be set and unset, or some other type of tool. The assembly of the downhole tool 102 and actuator 104 is deployed into the well 100 on a carrier structure 106, where the carrier structure can be a coiled tubing, jointed tubing, wireline, slickline, and so forth.

The actuator 104 has a delayed trigger mechanism that includes a higher pressure chamber 108 and a lower pressure chamber 110 that are interconnected by a porous medium (e.g., an orifice) 112. To activate the actuator 104, hydraulic fluid initially contained in the higher pressure chamber 108 is slowly metered through the orifice 112 into the lower pressure chamber 110 (which initially can contain air such that the lower pressure chamber 110 is at atmospheric pressure). The rate at which the hydraulic fluid flows from the higher pressure chamber 108 to the lower pressure chamber 110 through the orifice 112 provides a target delay to allow for delayed actuation of the downhole tool 102 (delayed from an activating signal, such as a signal provided through an electrical cable or fiber optic cable in the carrier structure 106, a hydraulic signal (elevated pressure or several cycles of elevated pressure), low-level pressure pulse signals, a mechanical stimulus, and so forth).

The actuator 104 can also include one or more movable pistons (not shown) that are moved in response to application of an elevated pressure to the actuator that causes initiation of the delayed trigger mechanism. Initiation of the delayed trigger mechanism causes the fluid to flow from the higher pressure chamber 108 to the lower pressure chamber 110. Upon depletion of a certain volume of the fluid from the higher pressure chamber 108, a signal is triggered in the actuator 104 to actuate the tool, where the signal can be a mechanical signal, an electrical signal, or a hydraulic signal.

A challenge associated with use of the actuator with delayed trigger mechanism is stability of the hydraulic fluid used in the delayed trigger mechanism at conditions that may be present in the well 100. Instability of one or more rheological characteristics of the hydraulic fluid may cause unpredictability in the delay provided by the delayed trigger mechanism. For example, if the hydraulic fluid exhibits unstable rheological characteristics (e.g., viscosity) at different temperature and pressure conditions, which may exist in the well 100, then the delay provided by the delayed trigger mechanism in the actuator mechanism 104 can vary unpredictably.

In accordance with some embodiments, a technique is provided to quantify one or more rheological characteristics of a hydraulic fluid at temperature and pressure conditions of interest in a well. In one embodiment, the rheological characteristic that is quantified is the viscosity of the hydraulic fluid. The technique involves providing a model of at least one rheological characteristic of the hydraulic fluid. Using such model, a behavior (e.g., delay) of the downhole tool, and more specifically, of the actuator, can be more accurately predicted for the expected temperature and pressure conditions.

Although the above refers to determining a delay based on one or more rheological characteristics of hydraulic fluids, it is noted that other behaviors of downhole tools that use hydraulic actuators can be predicted based on the model.

Also, although reference is made to actuators in the downhole tools that use hydraulic fluids, it is noted techniques according to some embodiments can also be applied to other types of fluids that are used by tools performing various operations.

In addition, by characterizing rheological characteristics of different hydraulic fluids using corresponding models, a technique according to some embodiments can also allow a well operator to select an optimal hydraulic fluid to use in the downhole tool 102 for expected temperature and pressure (or other) conditions in the well 100. It is desirable to use a hydraulic fluid that exhibits at least one rheological characteristic that is relatively stable at the expected temperature and pressure conditions in the well 100. Selection of a suitable fluid allows for better control of behavior of the downhole tool.

In the ensuing discussion, reference is made to the viscosity of a hydraulic fluid as being the rheological characteristic of interest. Note that the techniques discussed can be applicable to other rheological characteristics of fluids.

Figure 2:
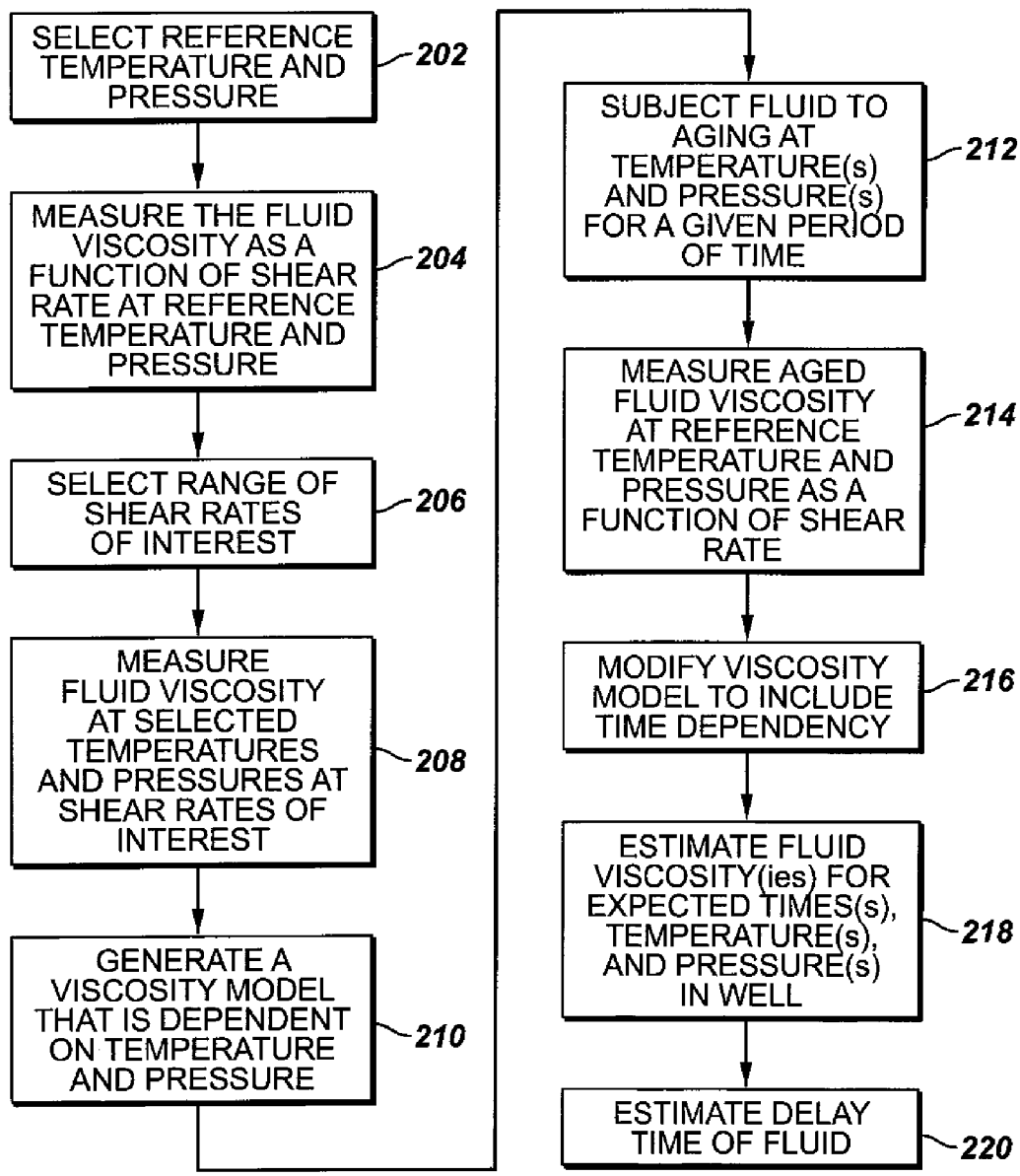
FIG. 2 is a flow diagram of a process of producing a model of a rheological characteristic of a hydraulic fluid and predicting a behavior of a tool for at least one expected condition in a well according to the model.

FIG. 2 shows a procedure according to an embodiment of building a model of the viscosity of a hydraulic fluid and determining a delay time associated with the actuator of a hydraulic tool based on the model. At least some of the tasks of the FIG. 2 procedure can be performed by a computer, as noted below.

Initially, a reference temperature $T_0$ and reference pressure $P_0$ are selected (at 202). The reference temperature can be room temperature, and the reference pressure can be atmospheric pressure. In other examples, other reference temperatures and pressures can be used. The reference temperature and pressure can be the temperature and pressure that exist in a lab setting, for example. Alternatively, the reference temperature and pressure can be some selectable temperature and pressure for use in a simulator.

Next, fluid viscosity as a function of shear rate at the reference temperature and pressure is measured (at 204). Such measurement can be performed in a lab setting for example, or based on simulation performed by a simulator. The shear rate is the gradient of velocity in a flowing material in this case the fluid that is to be used in the actuator of a downhole tool. The unit of measurement for shear rate can be $sec^{-1}$ (reciprocal seconds or inverse seconds).

Next, the procedure selects (at 206) the range of shear rates of interest. For example, the shear rates of interest can depend on the physical properties of the actuator, such as the size of an orifice of a delayed trigger mechanism in the actuator through which the fluid is expected to flow. The size of the orifice and/or other physical properties of the actuator can subject the fluid to a range of shear rates.

In the foregoing, the viscosity at the reference temperature and pressure that is a function of shear rate, $\gamma$, is expressed as $\eta_{exp}(T_0, P_0, t_0, \gamma)$, where $t_0$ represents an initial time. The selected range of shear rates of interest is expressed as $\gamma_0$. In the example, the range of shear rates of interest is one shear value, $\gamma_0$. In other implementations, the range of shear rates can include multiple shear rates. As examples, the range of shear rates can be 0.1 to 10,000 $sec^{-1}$.

Next, the fluid viscosity at selected pressures (P) and selected temperatures (T) are measured (at 208) at the shear rates of interest, with the fluid viscosity at such selected pressures and temperatures represented as $\eta_{exp}(T, P, t_0, \gamma_0)$. The selected temperatures (T) and pressures (P) can be temperatures and pressures that are expected to be encountered during a well operation using the downhole tool. Note that the measurements of the fluid viscosity performed at 208 can be performed in a lab setting or by a simulator, similar to the measurement performed at 204.

Next, a viscosity model that is dependent on temperature and pressure is generated (at 210) using a non-linear regression technique in one embodiment. The viscosities that are measured at various pressures and temperatures at the shear rates of interest performed at 208 provide various viscosity data points that are fitted, using non-linear regression, to provide the viscosity model that is dependent on temperature and pressure, expressed as $\eta_{exp}(T, P, t_0, \gamma_0)$. The generation of the viscosity model at 210 can be performed by a computer based on the various fluid viscosity data points fed to the computer, such as on a storage medium or communicated over a network. Alternatively, instead of generating the viscosity model using a non-linear regression technique, other modeling techniques can be used.

Next, the fluid is subjected to aging at one or more temperatures and one or more pressures over a given period of time ($t_a$). The temperature(s) and pressure(s) at which the fluid is aged correspond to the temperature(s) and pressure(s) that the fluid, as used in the downhole tool, is expected to be subjected to in a downhole environment when performing a well operation. Moreover, the given period of time, represented as $t_a$, represents the expected amount of time that the downhole tool, and thus the fluid, is expected to remain downhole at the temperature(s) and pressure(s). The aging can be performed in a lab setting or simulated using a simulator.

After the fluid has been aged, the aged fluid viscosity is measured (at 214) at the reference temperature $T_0$ and reference pressure $P_0$, as a function of the range of shear rates of interest ($\gamma_0$).

Next, if needed, the viscosity model, $\eta_{exp}(T, P, t_0, \gamma_0)$, is modified (at 216) to include time dependency. The viscosity model is modified if the aged fluid viscosity at the reference temperature and pressure indicate that the viscosity has changed after the aging was performed. On example model to accurately predict the hydraulic fluid viscosity $\eta_{mod}(T, P, t, \gamma_0)$ after aging at given temperature (T) and pressure (P) conditions for a given amount of time (t) is as follows:

$$\eta_{mod}(T, P, t, \gamma_0) = \eta_{mod}(T, P, t_0, \gamma_0) * [1 - \alpha(T) * t], \quad \text{(Eq. 1)}$$

where $\eta_{mod}(T, P, t_0, \gamma_0)$ is the estimated hydraulic fluid viscosity at given temperature (T) and pressure (P) prior to being subjected to aging, and $\alpha(T)$ is the rate of viscosity degradation at temperature T per unit of time. $\alpha(T)$ is determined based on the measurements at 202, 208, and 214. In one implementation, $\alpha(T)$ varies between $-0.0025$ and $+0.0025$ $hours^{-1}$. In a more specific implementation, $\alpha(T)$ varies between $-0.00075$ and $+0.00075$ $hours^{-1}$.

For such model, the estimated hydraulic fluid viscosity at given temperature (T) and pressure (P) prior to being subjected to aging, $\eta_{mod}(T, P, t_0, \gamma_0)$, is best estimated with:

$$\eta_{mod}(T, P, t_0, \gamma_0) = \eta_{exp}(T_0, P_0, t_0, \gamma_0) * \exp\{-\delta[(1/T_0) - (1/T)]\} * \exp\{(P - P_0)/\beta\}, \quad \text{(Eq. 2)}$$

where $\eta_{exp}(T_0, P_0, t_0, \gamma_0)$ is the measured hydraulic fluid viscosity at the reference temperature ($T_0$) and pressure ($P_0$) (as measured at 204) prior to being subjected to aging, $\delta$ is the rate of change of viscosity of the hydraulic fluid with temperature, and β is the rate of change of viscosity of the hydraulic fluid with pressure. The parameters δ and β are determined based on the measurements at 208. In one implementation, δ varies between 1,000 and 2,500 K⁻, and β varies between 0.00002 and 0.0002 psi (1.4 10⁻⁶ and 1.4 10⁻⁵ Pa). In a more specific implementation, δ varies between 1,600 and 2,200 K⁻, and β varies between 0.00006 and 0.00012 psi (4.2 10⁻⁶ and 8.8 10⁻⁶ Pa).

The fluid viscosity(ies) is (are) estimated (at 218) for the expected time(s), temperature(s), and pressure(s) in the well, based on the viscosity model developed at 216 or 210. For example, it is expected that the downhole tool may spend 300 hours at 300° C., then 100 hours at 400° C., in the well, the fluid viscosities at the various conditions over time are estimated. More generally, at least one rheological characteristic of the fluid is estimated for expected one or more downhole conditions in the well.

Examples of the hydraulic fluid include any one or more of low molecular weight polymer, low molecular weight silicone containing polymer, low molecular weight polydimethylsiloxane, low molecular weight polymethylphenylsiloxane, low molecular weight polydiphenylsiloxane, low molecular weight hydrocarbon containing polymer, low molecular weight polyethylene, low molecular weight polyalkylene, low molecular weight polybutylene, and any mixture of the above.

Next, given the estimated fluid viscosity(ies), the delay time(s) of the fluid in the actuator is estimated (at 220), based on a relationship of viscosity, temperature, and pressure, to delay time, for example. More generally, at 220, the behavior of the downhole tool that includes an actuator that contains the fluid is predicted based on the expected downhole condition(s) according to the model developed using techniques according to some embodiments.

Note that the tasks of 216, 218, and 220 in FIG. 2 can be performed by a computer.

Figure 3:
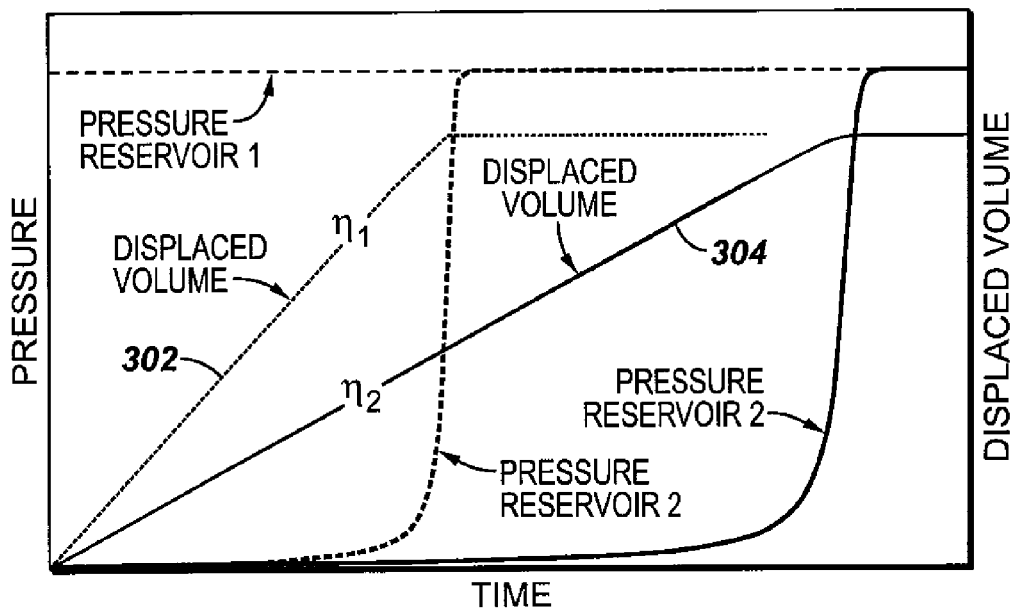
FIG. 3 is a graph that illustrates example relationships of pressure, viscosity, and delay time.

FIG. 3 shows example relationships between pressure, viscosity, and delay time of the fluid flowing through an orifice of an actuator in the downhole tool. The delay time corresponds to the amount of time that it takes a certain volume of fluid to flow across the orifice. In FIG. 3, curve 302 represents the volume of fluid transferred from the high pressure reservoir to the low pressure reservoir as a function of time for a fluid of viscosity, $\eta_1$. Curve 304 represents the volume of fluid transferred from the high pressure reservoir to the low pressure reservoir as a function of time for a fluid of higher viscosity, $\eta_2$. As illustrated in the example of FIG. 3, at any given pressure, the delay time is greater for a fluid that exhibits higher viscosity. For a particular tool, using the relationships plotted in FIG. 3, one can select the required viscosity the fluid needs to exhibit in order to achieve the desired delay time in the actuator.

As noted above, it is desirable to use a hydraulic fluid that is relatively stable. One characteristic of a stable hydraulic fluid is that the change of viscosity with aging at a given temperature and pressure is substantially negligible or small. Also, the rate of change of viscosity of the fluid is independent of the pressure at the range of pressures expected to be present in the well. Also, the fluid has a rate of change of viscosity with pressure that is independent of the temperature at the range of pressures that are expected to be present in the well. A change of viscosity can be considered negligible if the viscosity after aging is between 70% and 130% of the original viscosity, and more specifically, the change in viscosity after aging is between 85% and 115% of the original viscosity.

Figure 4:
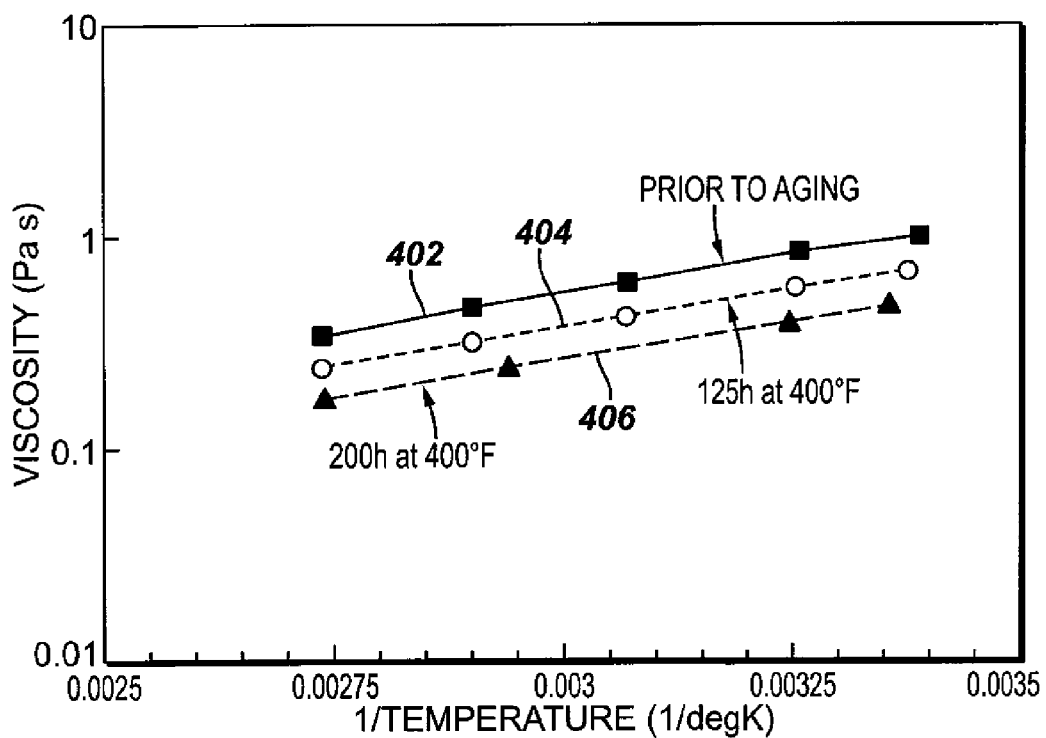
FIGS. 4 and 5 are graphs that illustrate aging effects on example hydraulic fluids.

A first example of a hydraulic fluid that can be used in a downhole tool is DC200 1000 cst (centistokes) oil supplied by Dow Corning. Such hydraulic fluid is essentially Newtonian polydimethylsiloxane. FIG. 4 shows effective aging of this first example hydraulic fluid, where curve 402 represents viscosity as a function of temperature⁻¹ of the fluid prior to aging, curve 404 represents viscosity as a function of temperature⁻¹ after aging 125 hours at 400° F. (205° C.), and curve 406 represents viscosity of the fluid as a function of temperature⁻¹ after aging for 200 hours at 400° F. (205° C.). Note that in this example there is approximately a decrease of viscosity of 25% after aging 125 hours at 400° F. (205° C.), and a decrease of viscosity of 50% after aging 200 hours at 400° F. (205° C.). Thus, the change of viscosity of this first example hydraulic fluid and the given temperatures cannot be considered to be negligible.

Figure 5:
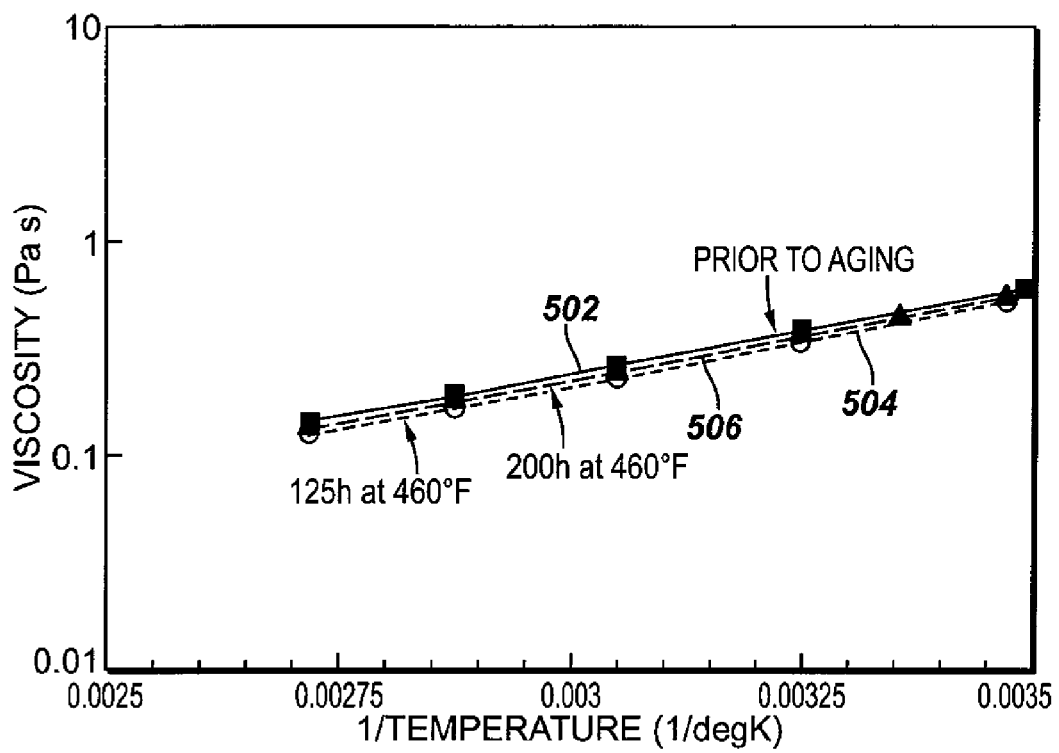

A second example fluid that can be used is DC510 500 cst oil supplied by Dow Corning, which has an aging characteristic depicted in FIG. 5. A first curve 502 represents viscosity as a function of temperature⁻¹ prior to aging, a second curve 504 represents viscosity as a function of temperature⁻¹ after aging 125 hours at 460° F. (238° C.), and a third curve 506 represents viscosity of the fluid after aging 200 hours at 460° F. (238° C.). Note that this second example fluid exhibits much less decrease in the viscosity after aging. Thus, the second example fluid would be a more suitable candidate for deployment in the actuator of the downhole tool than the first example fluid in some conditions.

Figure 6:
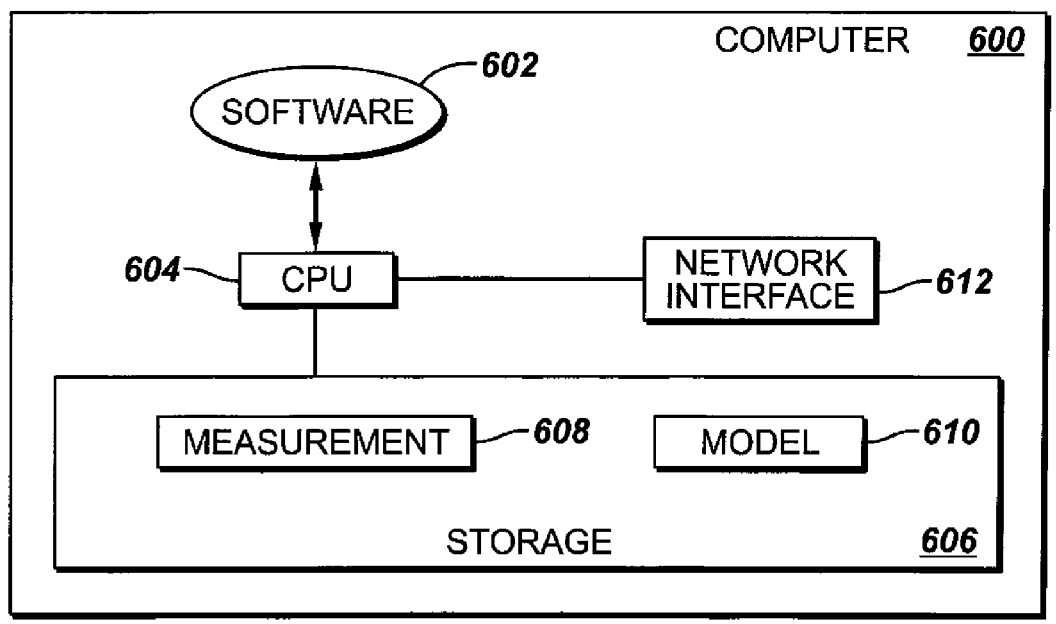
FIG. 6 is a block diagram of an example computer in which software is executable, where the software can perform at least some of the tasks of the process of FIG. 2.

As noted above, certain tasks of the procedure depicted in FIG. 2 can be performed by a computer, such as tasks 210, 216, 218, and 220. FIG. 6 shows an example computer 600 in which such tasks can be performed. The tasks can be performed by software 602 executable on one or more central processing units (CPUs) 604, which is connected to storage 606. The storage can store measurement data 608, such as the various measurement data collected according to the procedure of FIG. 2. Also, the storage 606 can store a model 610, such as the viscosity model produced according to the procedure of FIG. 2.

The CPU(s) 604 is (are) connected to a network interface 612, which allows the computer 600 to communicate with a remote computing device over a network. This allows the computer 600 to receive measurement data over the network. Alternatively, the measurement data 608 can be downloaded to the computer 600 by inserting a removable storage medium in a storage medium reader in the computer 600. Also, the network interface 612 allows the computer 600 to communicate the model 610 for use by remote computers.

Instructions of the software 602 are loaded for execution on a processor (such as the one or more CPUs 604). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of predicting a delayed actuation of a downhole tool, comprising:
   providing a first pressure chamber;
   providing a second pressure chamber;
   connecting the first pressure chamber with the second pressure chamber by way of an orifice;
   metering fluid initially contained in the first pressure chamber through the orifice into the second pressure chamber;
   providing a model of at least one rheological characteristic of the fluid;
   according to the model, predicting, using a computer, a behavior of the tool for at least one expected condition in a well, wherein the tool includes an actuator that uses the fluid; and
   according to the provided model, predicting, using a computer, a behavior of a tool for at least one expected condition in a well, wherein the tool includes an actuator that uses the fluid, wherein the modeling comprises using a viscosity equation, $$\eta_{mod}(T, P, t_0, \gamma_0) = \eta_{exp}(T_0, P_0, t_0, \gamma_0) * \exp\{-\delta[(1/T_0)-(1/T)]\} * \exp\{(P-P_0)/\beta\},$$

where $t_0$ represents an initial time, $\gamma_0$ represents at least one shear rate of interest, $\eta_{mod}(T, P, t_0, \gamma_0)$ is measured fluid viscosity at a reference temperature ($T_0$) and pressure ($P_0$) prior to being subjected to aging, $\delta$ is a rate of change of viscosity of the fluid with temperature (T), and) $\beta$ is a rate of change of viscosity of the hydraulic fluid with pressure (P); and
   subjecting the fluid to aging, where the aged fluid viscosity is represented as $\eta_{mod}(T, P, t, \gamma_0) = \eta_{mod}(T, P, t_0, \gamma_0) * [1-\alpha(T)*t]$, where $\eta_{mod}(T, P, t_0, \gamma_0)$ is estimated fluid viscosity at given temperature (T) and pressure (P) prior to being subjected to aging, and $\alpha(T)$ is a rate of viscosity degradation at temperature T per unit of time (t),
   wherein providing the model comprises providing a viscosity model, $\eta_{mod}(T, P, t_0, \gamma_0) = \eta_{exp}(T_0, P_0, t_0, \gamma_0) * \exp\{-\delta[(1/T_0)-(1/T)]\} * \exp\{(P-P_0)/\beta\}$, where $t_0$ represents an initial time, $\gamma_0$ represents at least one shear rate of interest, $\eta_{exp}(T_0, P_0, t_0, \gamma_0)$ is measured fluid viscosity at a reference temperature ($T_0$) and pressure ($P_0$) prior to being subjected to aging, $\delta$ is a rate of change of viscosity of the fluid with temperature (T), and) $\beta$ is a rate of change of viscosity of the hydraulic fluid with pressure (P).

2. The method of claim 1, wherein providing the model of the at least one rheological characteristic comprises providing the model of a viscosity of the fluid.

3. The method of claim 1, further comprising deploying the tool into the well.

4. The method of claim 3, further comprising triggering the tool downhole.

5. The method of claim 1, further comprising:
   measuring values of the at least one rheological characteristic of the fluid at selected pressures and temperatures; and
   generating the model based on the measured values of the at least one rheological characteristic.

6. The method of claim 1 including:
   subjecting the fluid to aging at one or more temperatures and one or more pressures for a given period of time; and
   modifying the model based on the aging, wherein predicting the behavior of the tool is based on the modified model.

7. The method of claim 6, further comprising measuring the at least one rheological characteristic of the fluid after aging of the fluid is performed, wherein modifying the model is based on the measurement performed after the fluid has been aged.

8. The method of claim 1, where $\delta$ varies between 1000 and 2500 $K^{-1}$.

9. The method of claim 1, where $\delta$ varies between 1600 and 2200 $K^{-1}$.

10. The method of claim 1, where $\delta$ varies between $1.4\,10^{-6}$ and $1.4\,10^{-5}$ Pa.

11. The method of claim 1, where $\delta$ varies between $4.2\,10^{-6}$ and $8.8\,10^{-6}$ Pa.

12. The method of claim 1, where $\alpha(T)$ varies between $-0.0025$ and $+0.0025$ hours$^-$.

13. The method of claim 1, where $\alpha(T)$ varies between $-0.00075$ and $+0.00075$ hours$^{-1}$.

14. The method of claim 1, wherein the fluid is selected from the group consisting of polymer, silicone-containing polymer, polydimethylsiloxane, polymethylphenylsiloxane, polydiphenylsiloxane, hydrocarbon-containing polymer, polyethylene, polyalkylene, polybutylene, and any mixture of the above.

15. The method of claim 1, wherein predicting the behavior of the tool comprises predicting a delay of the fluid passing through an orifice in the actuator of the tool.

16. The method of claim 15, wherein predicting the delay of the fluid passing through the orifice comprises predicting the delay of the delayed trigger mechanism in the actuator.

* * * * *